(12) United States Patent
Harter et al.

(10) Patent No.: US 9,942,261 B2
(45) Date of Patent: *Apr. 10, 2018

(54) DYNAMIC OPTIMIZING SCANNER FOR IDENTITY AND ACCESS MANAGEMENT (IAM) COMPLIANCE VERIFICATION

(71) Applicant: International Business Machines Corporation, Armonk, NY (US)

(72) Inventors: John Leslie Harter, Cary, NC (US); David Walsh Palmieri, Cary, NC (US); Jeffrey Tobias Robke, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,746

(22) Filed: Mar. 21, 2017

(65) Prior Publication Data
US 2017/0195360 A1 Jul. 6, 2017

Related U.S. Application Data

(63) Continuation of application No. 14/957,974, filed on Dec. 3, 2015, now Pat. No. 9,600,666.

(51) Int. Cl.
*G06F 12/14* (2006.01)
*H04L 29/06* (2006.01)

(52) U.S. Cl.
CPC ...... *H04L 63/1433* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 2003/0046128 A1 | 3/2003 | Heinrich | |
| 2005/0071643 A1* | 3/2005 | Moghe | G06F 21/316 713/182 |
| 2008/0104665 A1 | 5/2008 | Naldurg et al. | |

(Continued)

OTHER PUBLICATIONS

Gamby, "Integrating security information management systems with identity management systems ties policy violations and vulnerabilites to user activity," Information Security, Mar. 2010.

*Primary Examiner* — Brandon S Hoffman
(74) *Attorney, Agent, or Firm* — Jeffrey S. LaBaw; David H. Judson

(57) ABSTRACT

An identity and access management (IAM) system is associated with a set of data sources from which data is collected. A set of vulnerabilities that the IAM system should attempt to detect is identified. For each vulnerability to be detected, a prioritized list of strategies used to detect that vulnerability is generated. Preferably, each strategy specifies the type(s) of data required to detect that vulnerability. An algorithm to determine a best strategy to be used for detecting each vulnerability, preferably based on the data available from the data sources, is then identified. The IAM system then collects data in an optimized manner. In particular, during the collection process, the IAM system preferably collects only what is necessary based on the configuration, even if the data source is capable of providing additional data. The collected data is then processed to detect security vulnerabilities associated with the IAM accounts.

18 Claims, 7 Drawing Sheets

(56) References Cited

U.S. PATENT DOCUMENTS

| | | |
|---|---|---|
| 2010/0250411 A1 | 9/2010 | Ogrodski |
| 2010/0333002 A1 | 12/2010 | Karabey et al. |
| 2011/0191854 A1 | 8/2011 | Giakouminakis et al. |
| 2012/0079598 A1 | 3/2012 | Brock et al. |
| 2014/0041029 A1 | 2/2014 | Zhou |
| 2014/0189873 A1 | 7/2014 | Elder et al. |
| 2015/0033287 A1* | 1/2015 | Oliphant ............... G06F 21/554 726/1 |

* cited by examiner

```
/* Determine the types of data supported by the sources */
Initialize the MAP of SET of types of supported data by source to empty;   ──700
Initialize the SET of types of supported data across all sources to empty;   ──702
for each source:
    Get the SET of types of supported data for the current source;   ──704
    if the SET of types of supported data for the current source is not empty:   ──706
        Store the SET of types of supported data for the current source in the MAP of SET of types of   ──708
        supported data by source, using the current source as the key;
        Add the SET of types of supported data for the current source to the SET of types of   ──710
        supported data across all sources;
    end if;
end for loop;
```

FIG. 7

```
/* Determine what strategies to use and what types of data to collect */
Initialize the SET of strategies to use to empty;— 800
Initialize the SET of types of data to collect to empty;— 802
for each type of vulnerability:— 804
    for each strategy (in priority order) for the current type of vulnerability:
        Get the SET of types of required data for the current strategy;— 806
        if the SET of types of required data for the current strategy is empty:— 808
            /* If the strategy does no require any data, use it */— 810
            Add the current strategy to the SET of strategies to use;— 812
            Exit the for each strategy loop;— 814
        else if the SET of types of required data for the current strategy is a subset of the SET of types — 815
        of supported data across all sources:
            Add the current strategy to the SET of strategies to use — 816
            Add the SET of types of required data for the current strategy to the SET of types of data — 818
            to collect;
            Exit the for each strategy loop;— 820
        end if;
    end for loop;
end for loop;
Initialize the MAP of SET of types of data to collect by source to empty;— 822
if the SET of types of data to collect is not empty:— 824
    for each source in the MAP of SET of types of supported data by source:
        Get the SET of types of supported data for the current source from the MAP of SET of types of — 826
        supported data by source;
        Get the intersection of the SET of types of supported data for the current source and the SET — 828
        of types of data to collect;
        Store said intersection in the MAP of SET of types of data to collect by source, using the — 830
        current source as the key;
    end for loop;
end if;
```

FIG. 8

```
/* Collect the data */
Initialize the collected data to empty;  ╱‾900
for each source in the MAP of SET of types of data to collect by source:
    Get the SET of types of data to collect for the current source from the MAP of SET of types of data ╲╱902
    to collect by source;
    Retrieve said SET of types of data to collect from the current source; ╲╱904
    Add the retrieved data to the collected data; ╲╱906
end for loop;
```

FIG. 9

```
/* Detect the vulnerabilities */
for each strategy in the SET of strategies to use:
    Invoke the strategy to detect vulnerabilities given the collected data; ╲╱1000
end for loop;
```

FIG. 10

DYNAMIC OPTIMIZING SCANNER FOR IDENTITY AND ACCESS MANAGEMENT (IAM) COMPLIANCE VERIFICATION

BACKGROUND

Technical Field

This disclosure relates generally to the field of digital resource access, and more particularly to risk-based computer recertification of online access.

Background of the Related Art

Identity and Access Management Governance is a set of processes and policies for organizations to manage risks and maintain compliance with regulations and policies by administering, securing, and monitoring identities and their access to applications, information, and systems. Although potentially complex in implementation, the concept of Identity and Access Management (IAM) Governance is fairly straightforward: determine who should have access to what resources and who should not, according to government regulations, industry-specific regulations (SOX, HIPPA, GLBA, etc.), and business regulations and guidelines. Typically, key aspects of IAM Governance include access request governance, entitlement certifications, reports and audits, and analytics and intelligence (including role management, entitlement management, separation of duties enforcement, and privileged identity management). An end-to-end IAM Governance solution may also provide related functions, such as access enforcement, user provisioning, password management, and user lifecycle management.

Identity and access management (IAM) systems protect enterprise data and applications with context-based access control, security policy enforcement and business-driven driven identity governance. These systems may be operated in a standalone manner, in association with cloud-based environments, or in hybrid environments.

Automated systems for IAM health checking detect identity-centric risks within a governance system by scanning for one or more weakness patterns, such as too many Admins configured, account sharing, or cloning of access permissions. While detecting these and other such conditions provides useful information, known detection mechanisms are time-consuming and require large amounts of data to be read or extracted from multiple systems being governed. The problems associated with data collection in this context are exacerbated by the existence of multiple detection algorithms that may be available for evaluating a particular risk, and because detection algorithms have different levels of reliability as well as different data requirements. As a consequence, known IAM health checking techniques tend to operate with missing or imperfect data, or using algorithms that do not always fit the available data. Moreover, a best algorithm for a particular job typically cannot be pre-configured.

Known implementations that require a fixed set of data to detect vulnerabilities are not flexible, and they are incapable of detecting vulnerabilities using different strategies based on available data.

BRIEF SUMMARY

According to this disclosure, an identity and access management (IAM) system is augmented with the ability to execute different types of detection mechanisms based on various factors, such as the degree of reliability desired, the nature of the available data, cost, latency, and the like. In one implementation, the IAM system is associated with a set of data sources from which data is collected. A particular source may provide one or more types of data. A set of vulnerabilities that the IAM system should attempt to detect is identified. For each vulnerability to be detected, a prioritized list of strategies used to detect that vulnerability is then generated. Preferably, each strategy specifies the type(s) of data required to detect that vulnerability, as well as the code to detect it. An algorithm to determine a best strategy to be used for detecting each vulnerability, preferably based on the data available from the data sources, is then identified. Given this configuration, the IAM system then operates to collect data in an optimized manner. Thus, preferably each data source required to provide data is called to collect data for all of the configured vulnerabilities that are to be detected. During the collection process, the IAM system collects only what is necessary based on the configuration, even if the data source is capable of providing additional data.

Thus, according to this disclosure a best (or at least better) strategy for vulnerability detection is chosen based on the data sources available, and data collection is optimized so that a given data source preferably is invoked only once (or as few times as possible) to collect data for all vulnerabilities to be detected. In this manner, the IAM system operates much more efficiently, as unnecessary data either is not collected or its collection minimized.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 depicts representative pseudocode for determining the types of data supported by the data sources according to the high-level process flow in FIG. 6;

FIG. 8 depicts representative pseudocode to determine what strategies to use and what types of data to collect according to the high-level process flow in FIG. 6;

FIG. 9 depicts representative pseudocode for collecting the data from the data sources according to the high-level process flow in FIG. 6; and FIG. 10 depicts representative pseudocode for detecting vulnerabilities according to the high-level process flow in FIG. 6.

DETAILED DESCRIPTION OF AN ILLUSTRATIVE EMBODIMENT

Figure 1:
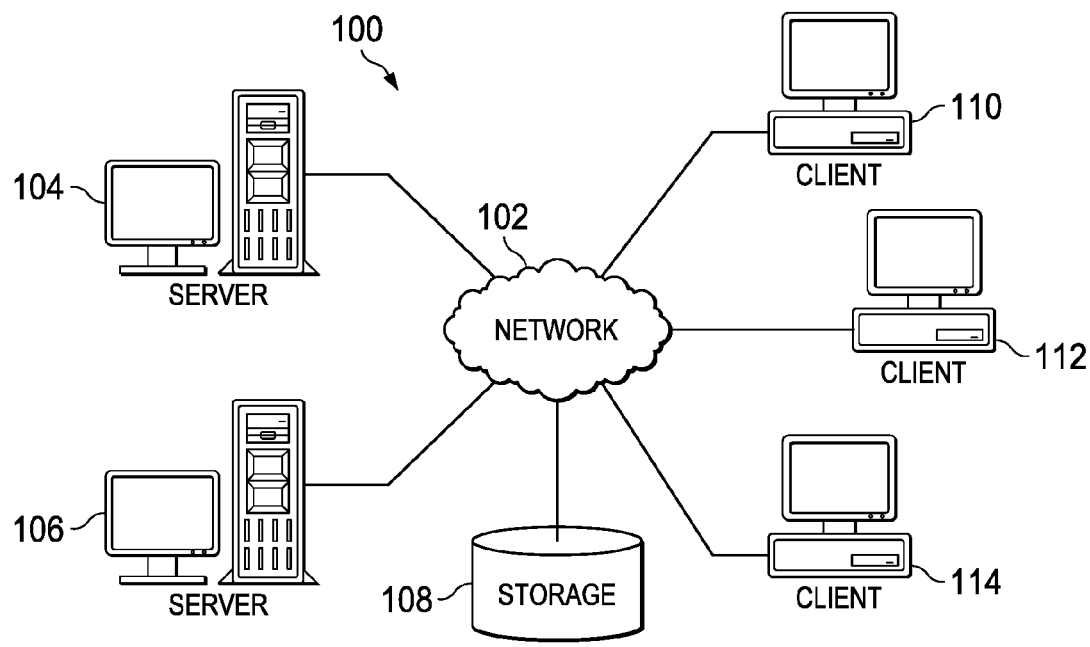
FIG. 1 depicts an exemplary block diagram of a distributed data processing environment in which exemplary aspects of the illustrative embodiments may be implemented.
Figure 2:
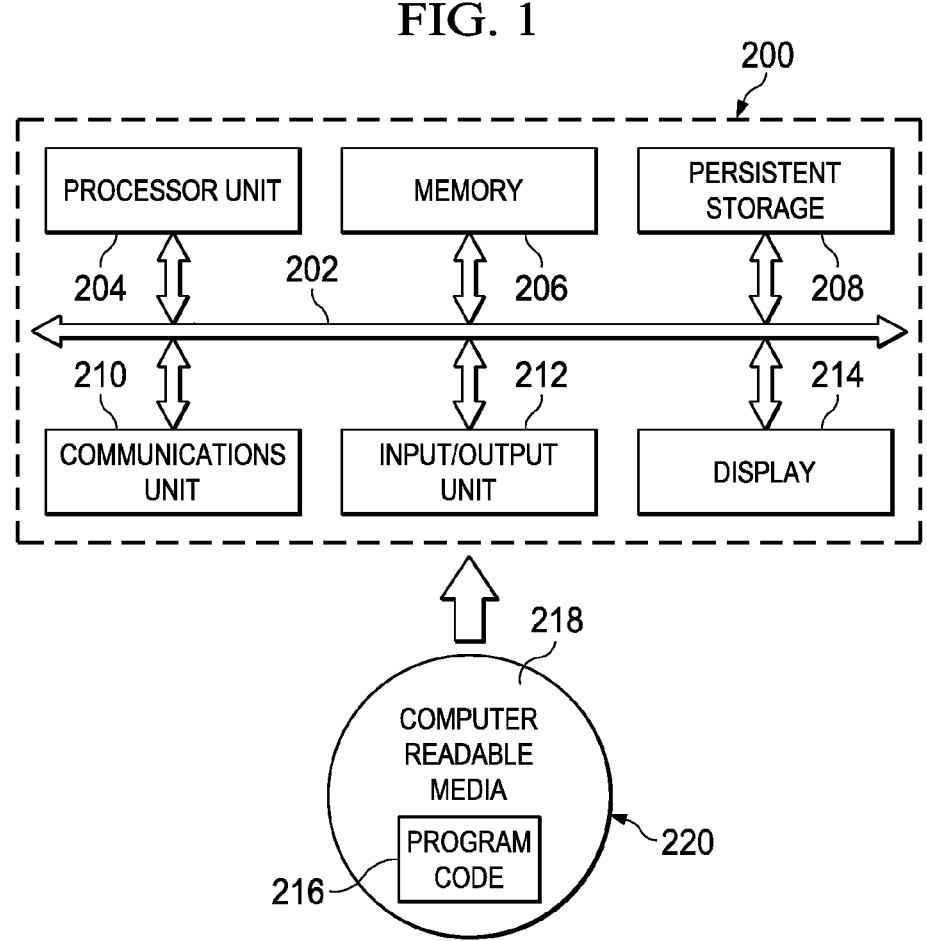
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Identity and Access Management

As used herein, an "account" typically refers to an entity that contains a set of parameters that define application-specific attributes of a principal, which include the identity, user profile, and credentials.

"Access" refers the ability to read, update, delete, or otherwise use a resource. Access to protected resources is typically controlled by system software.

A "credential" refers to a declaration of authorization or other security attributes of a subject that is typically validated and signed by a trusted third party. Typically, a credential represents the ID and authenticators (such as a password) for a resource.

An "entitlement" refers to a capability-based reason that a user is given a permission or set of permissions to access IT resources (services).

An "identity" refers to a subset of profile data that uniquely represents a person or entity and that is stored in one or more repositories.

A "dormant account" is an account that has not been used for a given, preferably configurable-time period (e.g., a number of days). A dormant account typically is associated with a service. Preferably, servers in the system are configured to record last login information, and to provide (return) this information upon request. By reconciling the last login information, the system can determine the existence of dormant accounts.

An "orphan account" is an account on a managed resource, an account whose owner cannot be automatically determined by the system.

An "ownership type" refers to a category that classifies ownership of accounts. One account preferably can have only one type of ownership. Accounts can be marked with different ownership types depending on their use. Default ownership types include, for example, device, personal, system, and vendor.

A "person" is an individual in the system that has a person record in one or more corporate directories.

A "policy" is a set of considerations that influence the behavior of a managed resource or a user.

A "principal" is a person or group that has been granted permissions. It also refers to an entity that can communicate securely with another entity.

A "recertification" refers to the process of validating and possibly updating credentials with a system, typically after a specified time interval. A "recertification policy" refers to a policy that defines the life cycle rule for automatically validating accounts and users in a provisioning system at a specified frequency. The policy sends approvals to the recertification policy participants asking if the accounts or users are still certified to use the managed resource for which the account was provisioned.

In identity management, "provisioning" refers to the process of providing, deploying, and tracking a service or component. To "provision" means to set up and maintain the access of a user to a system, or to create an account on a managed resource.

A "provisioning policy" is a policy that defines the access to various managed resources (services), such as applications or operating systems. Access is granted to all users, users with a specific role, or users who are not members of a specific role.

A "resource" is a hardware, software, or data entity.

A "role" is a logical group of principals that provide a set of permissions. Access to resources is controlled by using a provisioning policy to grant access to a role. A role can also represent a group of principals based on business job title or other business-related attributes.

A "service" is a representation of a managed resource, application, database, or system. In an identity management system, typically a service represents the user repository for a managed resource.

A "user" is an individual, organization, process, device, program, protocol, or system that uses the services of a computing system. For example, a user is an individual who uses the identity management system to manage their accounts and passwords, or that is managed by the system.

For many applications, networks, databases and other resources, users are given "access" by an authority or administrative role to enable activity associated with the resource. The conditions and limitations of the access for a given user are referred to as the "access entitlement" of the user, and include defined limitations as to the activities the user may perform with or on the resource. Access entitlements among users of the same resource can vary. For instance, a database administrator may have access and authority to read, write, edit, search, copy, delete and transfer data for a specific database, whereas others with access to the database may be limited to searching and reading data.

Identity management (IdM) is an administrative area that utilizes a system to identify individuals with membership or association, such as with a group, organization, company, etc. Additionally, an IdM system controls the individual's access to resources by use of restrictions or permissions. To facilitate better decisions for granting appropriate access, information regarding a user's request for access, their job role, and whether the access is a new request or renewal is considered, however, this limited information can prove ineffective in preventing high risk situations.

Control and oversight of resource access approval of individuals in business or enterprise organizations are further challenged by the turnover of personnel, the dynamic day-to-day changes and organizational restructuring, as well as application version upgrades. In large organizations, granting users the appropriate access entitlements to resources and maintaining access entitlements is a difficult task that can involve thousands of users and hundreds of resources. Resource access decisions and compliance verification responsibilities are typically allocated to supervisors or managers, who have few tools to facilitate decisions or identify risks and due to time constraints, often provide access in the belief that the individuals' performance will improve or not be impacted.

It is known in the prior art to provide software and services to deploy policy-based provisioning solutions. These solutions help companies automate the process of provisioning employees, contractors, and business partners with access rights to the applications they need, whether in a closed enterprise environment or across a virtual or extended enterprise. A known product of this type is IBM® Security Identity Manager.

Figure 3:
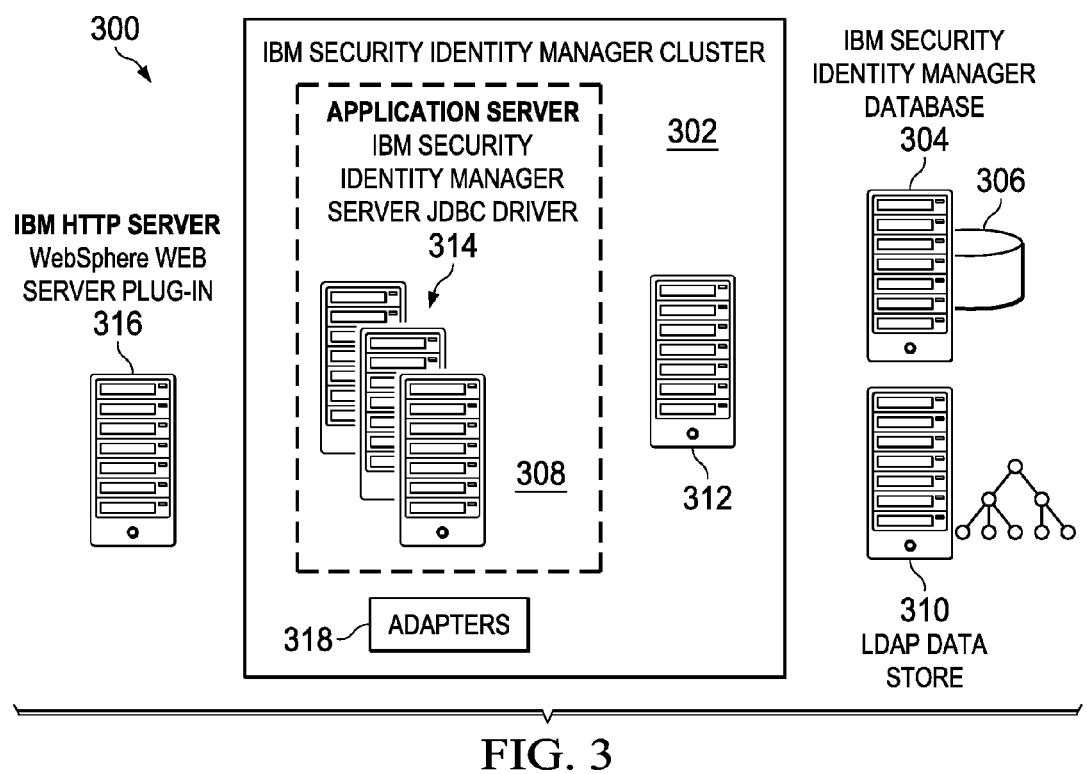
FIG. 3 is a representative security identity management system in which the disclosed subject matter may be implemented.

FIG. 3 is a block diagram of this commercially-available identity manager solution. In one embodiment, as will be described, the techniques of this disclosure may be implemented in such a solution. This identity manager solution, however, is merely representative and should not be taken to limit this disclosure. The representative commercial implementation is known as IBM® Security Identity Manager, Version 6.0. That product manages the identity records that represent people in a business organization. In particular, the product is an identity management solution that centralizes the process of provisioning records, such as provisioning accounts on operating systems, applications, etc., to users. Among other features, the product affords an organization the ability to add business processes and security policies to basic user management. As will be described in more detail below, the solution also affords the ability to add approvals for user requests for access. In general, the solution provides a uniform way to manage user accounts and to delegate administration, including self-service and a help desk user interface.

As illustrated in FIG. 3, the main components of the IBM® Security Identity Manager solution 300 include IBM Security Identity Manager Server 302 and required and optional middleware components, including adapters that provide an interface to managed resources. In a cluster configuration as illustrated, the components include a database server 304 that stores transactional and historical data, and a relational database 306 that maintains current and historical states of data. Computers that communicate with the database typically require a Java™ Database Connectivity (JDBC) driver 308. For example, a JDBC driver enables an IBM Security Identity Manager Server to communicate with a data source. IBM Security Identity Manager supports a JDBC type 4 driver to connect a Java-based application to a database. The supported database products are IBM DB2® Database, Oracle DB, and MS SQL Server database. As also seen in FIG. 3, the solution also includes a directory server 310 to store a current state of the managed identities (including user account and organizational data) in an LDAP (or equivalent) directory. Thus, for example, IBM Security Identity Manager supports the following products: IBM Tivoli® Directory Server, and Sun Enterprise Directory Server. The solution also preferably includes a directory integrator 312, such as IBM Tivoli Directory Integrator, to synchronize identity data in different directories, databases, and applications. IBM Tivoli Directory Integrator synchronizes and manages information exchanges between applications or directory sources. The solution also includes one or more application servers 314, such as IBM WebSphere®

Application Server. WebSphere Application Server runs a Java virtual machine (JVM) that provides a runtime environment for the application code. The application server provides communication security, logging, messaging, and Web services. As also seen in FIG. 3, typically the configuration includes one or more WebSphere Application Servers and a deployment manager that manages the cluster. The solution also typically includes an HTTP server and WebSphere Web Server plug-in 316. An HTTP server provides administration of IBM Security Identity Manager through a client interface in a web browser. Finally, the solution typically includes one or more IBM Security Identity Manager adapters 318. An adapter is a program that provides an interface between a managed resource and the IBM Security Identity Manager Server. Adapters function as trusted virtual administrators on the target platform for account management. For example, adapters do such tasks as creating accounts, suspending accounts, and modifying account attributes. An IBM Security Identity Manager adapter can be either agent-based or agentless. An agent-based adapter is one wherein the user installs adapter code directly onto the managed resource with which it is designed to communicate. An agentless adapter is deployed onto the IBM Security Identity Manager Server and the system that hosts IBM Tivoli Directory Integrator. In this case, the adapter code is separate from the managed resource with which it is designed to communicate.

As noted above, the implementation shown in FIG. 3 is not intended to be limiting but, rather, merely illustrates one possible operating environment; other commercial or proprietary implementations may include similar components and functionalities.

Each of the machines shown in FIG. 3 may be implemented using the machine architecture shown in FIG. 2; the various machines may interact with one another as illustrated in FIG. 1.

The security identity management solution of this type also may be implemented in whole or in part in a cloud-based solution.

Figure 4:
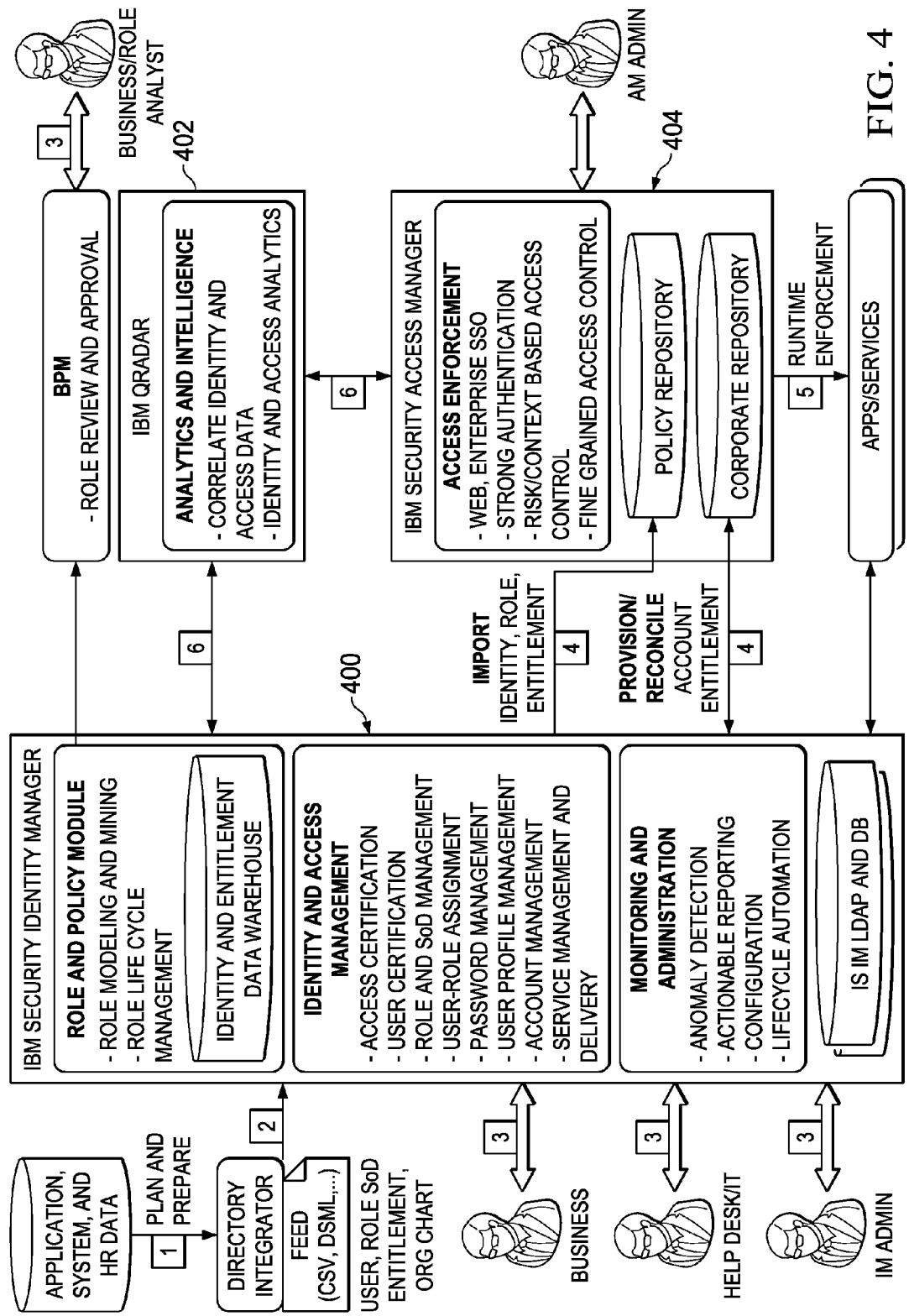
FIG. 4 illustrates a step-by step-guide for implementing IAM governance using an Identity and Access Management system.

FIG. 4 illustrates a representative step-by step-guide for implementing IAM governance using an Identity and Access Management system 400 such as IBM Security Identity Manager. In this embodiment, an end-to-end solution is provided in association with several other systems including a Security Information and Event Management (SIEM) software system 402 (e.g., IBM QRadar®), and an access and entitlement enforcement system (e.g., IBM® Security Access Manager) 404.

At step (1), the enterprise identifies the resources that it wants protected and the accesses it wants certified and monitored. The data is cleaned, filtered, and prepared for loading into the Identity and Access Management system 400 through one or more known mechanisms, or an API. At step (2), the data may be loaded into a role and policy module 402 for modeling and management. This data can come from various sources: Human Resources (HR), a planning and modeling tool, or manual entry. In a typical use case, the data gathered during planning is saved (e.g., in a standard CSV file) and then imported into IBM Security Identity Manager for role and policy modeling. The system can export the modeled role and entitlement data (e.g., in XML format) and load it for lifecycle management and certification. At step (3), stakeholders and participants can use the Identity and Access Management system 400 for the various tasks that they must perform, such as requesting accesses and roles, approving access and role requests, certifying, managing, and modeling roles, and reviewing and certifying roles and entitlements. The certification data can be used to clean, adapt, and evolve the system. At step (4), the access and entitlement enforcement system 404 imports or provisions the data from Identity and Access management system 400 into the access and entitlement enforcement systems. At step (5), the enforcement system 404 uses the certified data for runtime enforcement. The SIEM system 402 monitors actual user activity and provides feedback to fine-tune access policy planning, administration, and enforcement.

As illustrated in FIG. 4, one of the responsibilities of the Identity and Access Management system 400 is to provide initial and periodic access certification for continued business needs to help direct and control operations. Access certification typically includes review and certification of user access assignment via role or direct assignment to determine who received access to what, when, and why. It ensures that users have only the privileges and exception entitlements they need to perform their job. Access certification can also be used to detect policy violations, access anomalies, and orphan and dormant accounts. The IAM system typically also maintains certification and access change history, which aids the certification and audit processes.

Vulnerability Scanning in an IAM System

An IAM system may include an application known as a vulnerability scanner. A vulnerability scanner detects security vulnerabilities in application usage or configuration. For example, the vulnerability scanner might detect Microsoft Office 365 accounts that are associated with a Company, even though the owner of the account is no longer employed by the Company. Or, the vulnerability scanner might detect Salesforce.com administrator accounts that were provisioned outside of the Company's approved process. This is a so-called "out of process" assignment. The above are merely representative IAM vulnerabilities that a vulnerability scanner of this type might detect.

An IAM vulnerability scanner provides a configuration tool that allows a user to specify a set of sources from which to collect data. A data source might be a live system (e.g., Salesforce.com), or it might be static, such as a log file. Some live data sources provide application programming interfaces (APIs) that the vulnerability scanner can invoke to determine what type (s) of data the source can provide. For other cases, the type(s) of data provided by live and static sources can be determined, typically based on the specific type. Thus, for example, a cloud application (e.g., Office 365) might identify the type(s) of data available. Or, the type(s) of data contained in static log files might be determined, for example, using a file naming convention or header information. As will be described below, the technique of this disclosure assumes it is possible to determine the type(s) of data supported by each source without actually collecting the data.

By way of further background, consider one type of vulnerability detection referenced above, namely, out of process assignment. In this example, suppose that a Company running Salesforce.com (or some other cloud application) having an IAM system with vulnerability scanner has implemented what might be considered a "best practice." According to this practice, assume that an employee must submit a request for administrator access to the cloud application, which must be approved by a manager, before a centralized provisioning agent invokes a cloud application API to create the new administrator account, or update the employee's existing Salesforce.com account to give it administrative privileges. To detect an out of process assignment in this case, the vulnerability scanner would have to collect the following types of data: a list of accounts from Salesforce.com, including account attribute(s) that indicate whether the account has administrative privileges, as well as attribute(s) facilitating ownership correlation; audit records from an account approval system, indicating who submitted each request, who approved each request, and when the activity occurred; and a list of employees, e.g., from the Company's HR system, so that the Salesforce.com accounts can be correlated to an owner, and so that the approval system audit records can be correlated to people. Based on these data sources, an out of process assignment would be detected, for example, if all of the following conditions are met: a given Salesforce.com account has administrative privileges, ownership of the Salesforce.com administrative account is correlated to a person in the HR system, and there is no approval system audit record indicating that the account owner's manager approved a request for the Salesforce.com administrative privileges.

As another example scenario, assume another Company has not implemented the "best practice" described above. In particular, suppose that, instead of having an approval process, the Company has a centralized identity management system through which all provisioning actions are supposed to occur. To detect an out of process assignment in this case, the vulnerability scanner would have to collect the following types of data: a list of accounts from Salesforce.com, including account attribute(s) that indicate whether the account has administrative privileges, as well as attribute(s) facilitating ownership correlation; audit records from the centralized identity management system, showing when each account was created with administrator privileges, or updated to include administrator privileges; and a list of employees from the Company's HR system so that the Salesforce.com accounts can be correlated to an owner, and so that the centralized identity management audit records can be correlated to people. In this scenario, the out of process assignment would be detected, for example, if all of the following conditions are met: a Salesforce.com account has administrator privileges, ownership of the Salesforce.com administrative account is correlated to a person in the HR system, and there is no audit record from the centralized identity management system indicating that it created the Salesforce.com account with administrative privileges, or updated the Salesforce.com account to give it administrative privileges.

As yet another example, scenario, assume that the Company does not have an approval process, and that it uses a centralized identity management system that does not audit detailed privilege information. Rather, perhaps the centralized identity management system simply audits that the privileges are specified or changed. To detect an out of process assignment in this example, the vulnerability scanner would have to collect the following types of data: a list of accounts from Salesforce.com, including account attribute(s) that indicate whether the account has administrative privileges, as well as attribute(s) facilitating ownership correlation; audit records from the centralized identity management system showing when each account was created or updated, including whether the privileges were changed; and a list of employees from the Company's HR system so that the Salesforce.com accounts can be correlated to an owner, and so that the centralized identity management system audit records can be correlated to people. In this example scenario, the out of process assignment would be detected, for example, if all of the following conditions are met: a Salesforce.com account has administrator privileges, ownership of the Salesforce.com administrative account is correlated to a person in the HR system, and there is no audit record from the centralized identity management system indicating that the privileges were specified or changed.

As the above examples illustrate, the reliability or confidence level of the vulnerability degrades with each configuration. That is, (in the first scenario) if the criteria for detecting the vulnerability for the Company using the "best practice" approach are met, it is highly likely that the account was given administrative privileges outside of the process. Further, in this scenario if the criteria for the "best practice" approach are not met, it is highly unlikely that the account represents an out of process assignment. In the third scenario, however, if the Company using the centralized identity management system has "weak" auditing, the results produced are of lower confidence. For example, the vulnerability would not be detected if the centralized identity management system updated the account to include some non-administrative privileges, but someone also went directly to Salesforce.com (i.e., not through the centralized identity management system) and updated the account to include administrator privileges. In this case, the vulnerability scanner would not detect the vulnerability.

Dynamic Optimizing Scanner for IAM Compliance Verification

With the above as background, the subject matter of this disclosure is now described. As described above, and according to this disclosure, an identity and access management system is augmented (i.e. extended or supplemented) to include a vulnerability scanner that is optimized according to the techniques that are now described. In one implementation, the vulnerability scanner is an application, e.g. computer program instructions executed in one or more processors. The vulnerability scanner may be implemented using co-located functionalities, or using functions that are distributed across multiple machines (and physical locations). The vulnerability scanner may be a standalone process, it may be network-accessible, or a hybrid of standalone and network-accessible components or functions.

Figure 5:
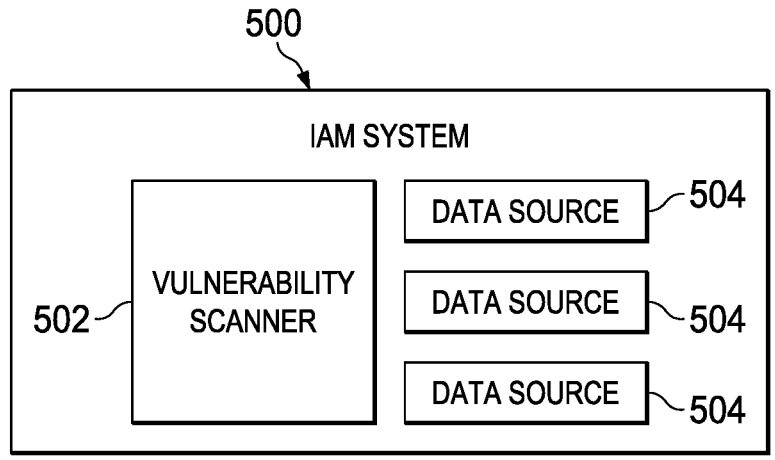
FIG. 5 depicts an IAM system that is enhanced to include an optimized vulnerability scanner according to this disclosure.

As depicted in FIG. 5, an IAM system 500 includes a vulnerability scanner application 502. The vulnerability scanner 502 is associated with a set of data sources 504. The identity of those data sources may be pre-configured or otherwise determined by the IAM system or specified by the user. It is assumed that a data source 504 (and typically each data source) provides one or more types of data. Thus, for example, a source might be "live" (e.g., an application providing one or more APIs for retrieving data), "static" (e.g., a log file), or some combination. Typically, the type(s) of data provided by a particular one of the data sources 504 can be determined without incurring the overhead of collecting the data produced by that source. The vulnerability scanner 502 is operative to detect security vulnerabilities, e.g., in application usage or configuration. As described above, the vulnerability scanner may be configured to detect when cloud accounts are associated with the Company but the owner of the account is no longer employed. Or, the scanner might be configured to detect administrator accounts that have been provisioned outside of the Company's approved process. These are just representative examples, as the nature and type of vulnerability detection provided by the vulnerability scanner may be varied. Thus, it is assumed that there are a set of vulnerabilities that exist, and the nature and type(s) of those vulnerabilities may be determined by the system or otherwise specified by a permitted user. The vulnerability scanner 502 thus is configured to attempt to detect those one or more vulnerabilities.

According to this disclosure, for each type of vulnerability, preferably the IAM system 500 defines a prioritized list of strategies that will be used to detect that vulnerability. Preferably, each strategy specifies the type(s) of data required to detect the vulnerability, as well as the code to detect it. An algorithm for determining the best (or, at least a better or preferred) strategy to be used for detecting a particular (and preferably each) vulnerability is then implemented. Preferably, the algorithm implemented is based on the data available from the data sources. According to this technique, preferably data is collected for use by the vulnerability scanner in a manner that, with respect to the data collection requirements, is highly-efficient. In this approach for collecting the data, preferably each data source is called just once to collect data for all of the configured vulnerabilities, collecting only what is necessary even if the data source is capable of providing additional data.

Figure 6:
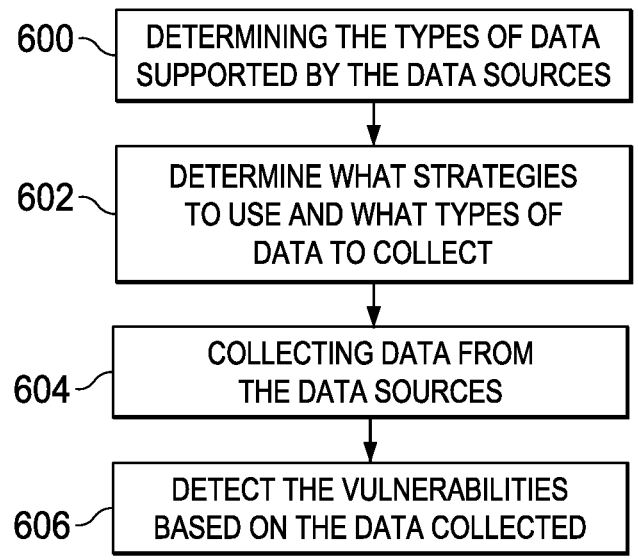
FIG. 6 depicts a high-level process flow of the operation of the IAM system.

FIG. 6 depicts the high level process flow of this technique. The process begins at step 600 by determining the types of data supported by the sources. At step 602, and based on the types of data as determined in step 600, the process determines what strategies to use and what types of data to collect. At step 604, and based on the strategies as determined in step 602, the process continues by collecting the data. At step 606, and based on the data collected, the process continues to detect the vulnerabilities. Each of these steps are described in more detail below.

FIG. 7 depicts representative pseudocode (© IBM 2015, all rights reserved) for a representative routine to determine the types of data supported by the sources (step 600 in FIG. 6). The routine begins at step 700 to initialize to "empty" of a MAP of a SET of types of supported data by source. At step 702, a SET of types of supported data across all data sources is initialize to "empty." The MAP and SET are each a data structure, such as a data array, a linked list, or the like. Then, a loop is initiated for each data source that includes the following steps. At step 704, the routine gets the SET of types of supported data for the current source. A test is then performed at step 706 to determine if the SET of types of supported data for the current source is not empty. If the outcome of the test at step 706 is positive, the routine executes an inner processing loop; in particular, at step 708 the SET of types of supported data for the current source is stored in the MAP of SET of types of supported data by source, using the current source as a key. At step 710, the SET of types of supported data for the current source is then added to the SET of types of supported data across all sources. The inner loop initiated at step 706 is then exited, followed by exit of the loop initiated for each data source. This completes the processing.

FIG. 8 depicts representative pseudocode routine to determine what strategies to use and what types of data to collect. This is step 602 in FIG. 6.

The routine begins at step 800 to initialize to empty a SET of strategies to use. At step 802, a SET of types of data to collect is initialized to empty. The SET of strategies and the SET of types of data are data structures. A loop is then carried out for each type of vulnerability. This loop is initiated at step 804. In particular, for each strategy (in priority order) for the current type of vulnerability, the routine gets the SET of types of required data for the current strategy at step 806. At step 808, a test is executed to determine if the SET of types of required data for the current strategy is empty. If the strategy does not require any data, the strategy is used. This is step 810. At step 812, the current strategy is added to the SET of strategies to use. The "for each strategy" loop is then exited at step 814. If the SET of types of required data for the current strategy is not empty, a test is executed at step 815 to determine if the SET of types of required data for the current strategy is a subset of the SET of types of supported data across all sources. If the test at step 815 is true, the routine continues at step 816 to add the current strategy to the SET of strategies to use. At step 818, the routine adds the SET of types of required data for the current strategy to the SET of types of data to collect. The "for each strategy" loop is then exited at step 820. The above-described processing is carried out for each type of vulnerability.

As also depicted in FIG. 8, another data set, namely, a MAP of SET of types of data to collect by source, is then initialized to empty. This is step 822. A test is then performed at step 824 to determine if the SET of types of data to collect is not empty. If not, then the following processing is carried out for each source in the MAP of SET of types of supported data by source. At step 826, the routine gets the SET of types of supported data for the current source from the MAP of SET of types of supported data by source. At step 828, the routine gets the intersection of the SET of types of supported data for the current source and the SET of types of data to collect. At step 830, the routine stores the intersection in the MAP of SET of types of data to collect by source, using the current source as the key. All sources in the MAP of SET of types of supported data by source are processed in this manner.

FIG. 9 depicts representative pseudocode for the function of collecting the data from the data sources. This is step 604 in FIG. 6. The routine begins at step 900 by initializing a data structure, the collected data, to empty. For each data source in the MAP of SET of types of data to collect by source, the process then carries out the following processing steps. At step 902, the routine gets the SET of types of data to collect from the current source from the MAP of SET of types of data to collect by source. At step 904, the routine retrieves the SET of types of data to collect from the current source. The routine then adds the retrieved data to the collected data at step 906. The routine exits the loop after each source in the MAP of SET of types of data to collect by source is processed in this manner. This completes the processing.

Finally, FIG. 10 depicts representative pseudocode to detect vulnerabilities, which is step 606 in FIG. 6. The routine is operative for each strategy in the SET of strategies to use. To this end, at step 1000, the routine invokes the strategy to detect vulnerabilities given the collected data. The processing loop is then exited once each strategy is processed in this manner. This completes the processing.

The data structures and functions represented by the pseudocode are merely representative of one embodiment. Other data structures or functions may be used, or given data structures and functions identified may be combined in whole or in part.

The vulnerability scanner may be configured using a configurator or other provisioning interface (e.g., a set of web pages, a command line, a programmatic interface, or the like).

The technique of this disclosure provides significant advantages. It enables the IAM system to dynamically choose the best strategy for vulnerability detection based on the data available. Further, the technique optimizes the data collection so that a given data source is invoked preferably only once to collect data for all vulnerabilities. In this manner, no unnecessary data is collected, thereby enhancing the performance and operation of the IAM system in general and the vulnerability scanner in particular. By aggregating multiple data sources for real-time analysis in this manner, the ability of the overall IAM system to detect vulnerabilities in application usage and configuration is optimized, and the technique overcomes the noted deficiencies of the prior art.

Preferably, for each type of vulnerability, only a highest priority strategy for which the required types of data are available are used. The notion of "highest" need not be based on any absolute requirement, but it may also be "relative" to some other value. Preferably, data is collected only from sources capable of providing the types of data required by the selected strategies. Thus, if a source exists that only provides data relevant to unselected lower-priority strategies, the source is not contacted (at step 604) to collect data. Preferably, in step 604 a source is contacted once to collect data for all of the selected strategies, rather than once each selected strategy. Further, when a source is contacted to collect data, it is instructed to collect only the types of data required by the selected strategies. If the source also is capable of collecting other types of data not required by the selected strategies, preferably it is instructed not to collect those additional types of data. Further, preferably a source is never asked to collect data that it is not capable of providing.

In this manner, the technique of this disclosure provides that, with respect to a particular vulnerability to be detected by the scanner, a "best" (i.e. most reliable or most accurate) strategy is selected. The notion of "best" in this context need not be based on any absolute or optimal requirement, but it may also be "relative" to some other value. As used herein, the approach also is said to be "dynamic," in part because it is based on the data that can and should be collected to support a detection strategy and before that data collection actually occurs. In this way, the collection of data is optimized so that only the required data is collected from only the required sources.

Additionally, when the tool is implemented in a cloud or other network-accessible manner (e.g., software-as-a-service), preferably the "best" strategy is selected for each user (e.g., a customer) based on the sources available in the user's operating environment. In particular, the strategy used for one customer to detect a particular vulnerability may be different than that used for another customer having different sources of data at the latter's disposal. Further, as the data sources in a given customer's operating environment change and/or update over time (e.g., based on new products, product upgrades, product deprecation, changes in business process, etc.), the algorithm automatically adjusts to adopt the "best" strategy based on the user's then-current operating configuration.

More generally, the functionality described above may be implemented as a standalone approach, e.g., one or more software-based functions executed by a hardware processor (or multiple such processors), or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. In particular, vulnerability scanner functions (or components thereof) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the vulnerability scanner is implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, identity access and management systems, as well as improvements to the functioning of data collection and vulnerability scanners within such systems.

Having described our invention, what we claim is as follows:

1. A method to facilitate detection of security vulnerabilities in accounts provisioned in an identity and access management (IAM) system, comprising:
   determining types of data supported by a set of data sources;
   based on the types of data supported by the set of data sources, determining a set of one or more vulnerability detection strategies to apply to detect the security vulnerabilities;
   based on the set of one or more vulnerability detection strategies, collecting data from the data sources, wherein during data collection a given data source of the set of data sources is invoked just once to collect data for all of the set of one or more vulnerability detection strategies;
   based on the data collected, executing the set of one or more vulnerability detection strategies; and
   updating at least one vulnerability detection strategy as the set of data sources is changed or updated.

2. The method as described in claim 1 wherein first and second data sources of the set of data sources provide distinct types of data from one another.

3. The method as described in claim 1 wherein the types of data include one of:
   live data, static data, and a combination of live and static data.

4. The method as described in claim 1 wherein determining a set of one or more vulnerability detection strategies determines a strategy for vulnerability detection that, relative to at least one other strategy for vulnerability detection, is optimized based on the types of data supported by the set of data sources.

5. The method as described in claim 1 wherein determining a set of one or more vulnerability detection strategies determines a strategy for vulnerability detection that, relative to at least one other strategy for vulnerability detection, is optimized based on an operating environment in which the security vulnerabilities are to be detected.

6. The method as described in claim 1 wherein the IAM system is associated with a multi-tenant cloud compute environment, and wherein a vulnerability detection strategy for a first tenant is distinct from a vulnerability detection strategy for a second tenant.

7. An apparatus, comprising:
   a processor;
   computer memory holding computer program instructions executed by the processor to facilitate detection of security vulnerabilities in accounts provisioned in an identity and access management (IAM) system, the computer program instructions operative to:
   determine types of data supported by a set of data sources;
   based on the types of data supported by the set of data sources, determine a set of one or more vulnerability detection strategies to apply to detect the security vulnerabilities;
   based on the set of one or more vulnerability detection strategies, collect data from the data sources, wherein during data collection a given data source of the set of data sources is invoked just once to collect data for all of the set of one or more vulnerability detection strategies;
   based on the data collected, execute the set of one or more vulnerability detection strategies; and
   update at least one vulnerability detection strategy as the set of data sources is changed or updated.

8. The apparatus as described in claim 7 wherein first and second data sources of the set of data sources provide distinct types of data from one another.

9. The apparatus as described in claim 7 wherein the types of data include one of: live data, static data, and a combination of live and static data.

10. The apparatus as described in claim 7 wherein the computer program instructions that determine a set of one or more vulnerability detection strategies determine a strategy for vulnerability detection that, relative to at least one other strategy for vulnerability detection, is optimized based on the types of data supported by the set of data sources.

11. The apparatus as described in claim 7 wherein the computer program instructions that determine a set of one or more vulnerability detection strategies determine a strategy for vulnerability detection that, relative to at least one other strategy for vulnerability detection, is optimized based on an operating environment in which the security vulnerabilities are to be detected.

12. The apparatus as described in claim 7 wherein the IAM system is associated with a multi-tenant cloud compute environment, and wherein a vulnerability detection strategy for a first tenant is distinct from a vulnerability detection strategy for a second tenant.

13. A computer program product in a non-transitory computer readable medium for use in a data processing system, the computer program product holding computer program instructions which, when executed by the data processing system, facilitate detection of security vulnerabilities in accounts provisioned in an identity and access management (IAM) system, the computer program instructions operative to:
   determine types of data supported by a set of data sources;
   based on the types of data supported by the set of data sources, determine a set of one or more vulnerability detection strategies to apply to detect the security vulnerabilities;
   based on the set of one or more vulnerability detection strategies, collect data from the data sources, wherein during data collection a given data source of the set of data sources is invoked just once to collect data for all of the set of one or more vulnerability detection strategies;
   based on the data collected, execute the set of one or more vulnerability detection strategies; and
   update at least one vulnerability detection strategy as the set of data sources is changed or updated.

14. The computer program product as described in claim 13 wherein first and second data sources of the set of data sources provide distinct types of data from one another.

15. The computer program product as described in claim 13 wherein the types of data include one of: live data, static data, and a combination of live and static data.

16. The computer program product as described in claim 13 wherein the computer program instructions that determine a set of one or more vulnerability detection strategies determine a strategy for vulnerability detection that, relative to at least one other strategy for vulnerability detection, is optimized based on the types of data supported by the set of data sources.

17. The computer program product as described in claim 13 wherein the computer program instructions that determine a set of one or more vulnerability detection strategies determine a strategy for vulnerability detection that, relative to at least one other strategy for vulnerability detection, is optimized based on an operating environment in which the security vulnerabilities are to be detected.

18. The computer program product as described in claim 13 wherein the IAM system is associated with a multi-tenant cloud compute environment, and wherein a vulnerability detection strategy for a first tenant is distinct from a vulnerability detection strategy for a second tenant.

* * * * *